May 29, 1934.   C. R. ROCHE   1,960,457
FORE WHEEL DRIVE CONSTRUCTION
Filed June 25, 1929
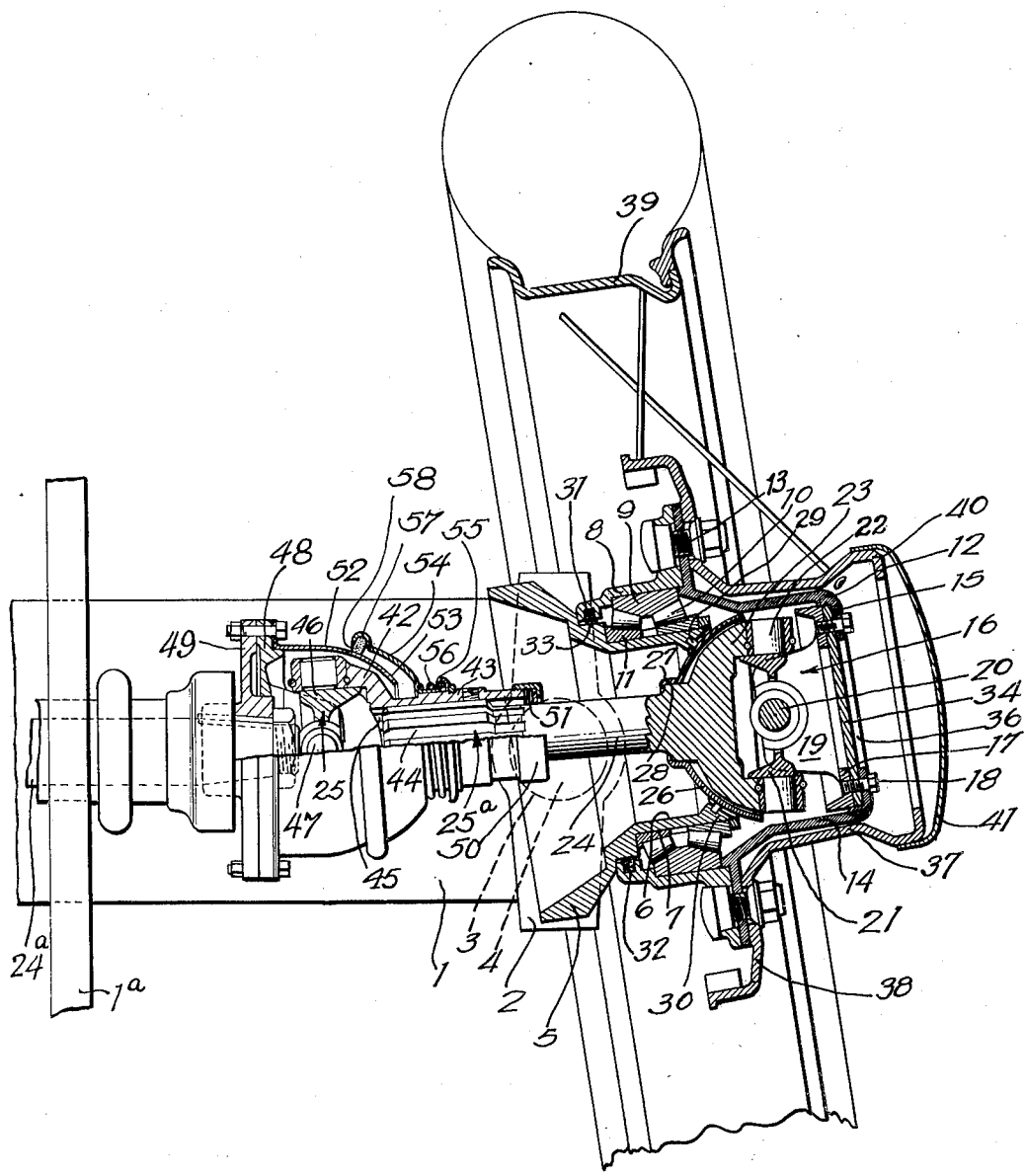
INVENTOR.
Clifton R. Roche
BY Lyon & Lyon
ATTORNEYS.

Patented May 29, 1934

1,960,457

UNITED STATES PATENT OFFICE 1,960,457

FORE WHEEL DRIVE CONSTRUCTION

Clifton R. Roche, Los Angeles, Calif.

Application June 25, 1929, Serial No. 373,533

8 Claims. (Cl. 180—43)

This invention relates to a flexible drive connection of the type illustrated in my Patent No. 1,535,497, granted to me on April 28, 1925 for a vehicle wheel. While the present invention is particularly applicable in a flexible drive connection for driving the forward wheels of an automobile, features of the invention could be applied in other situations.

In this type of drive, a transverse drive shaft is provided which extends toward the driven wheel and the outer end of this shaft is provided with a universal drive connection that connects it to a hub-shaft that extends outwardly, the outer end of the hub-shaft being provided with a universal joint connecting it to the hub of the wheel.

As illustrated in the patent referred to, this hub-shaft was provided with a telescoping splined connection associated with the universal connection at the wheel hub. The locating of the telescoping splined connection at the wheel hub has some objections, one of which is that it makes it more difficult to exclude road dirt from the universal connection at the hub. Furthermore, that location for the telescoping splined connection at the wheel hub necessitates a relatively large diameter for the tubular housing on which the wheel has its bearing.

The general object of this invention is to improve the general construction of such a flexible drive connection and to provide a drive of this kind which will enable the bearing for the wheel to be made of reduced diameter.

A further object of the invention is to provide an effective tubular housing capable of swinging forward and back to steer the wheel, at the same time giving ample clearance for the hub-shaft and facilitating the provision of means for excluding road dirt from the wheel bearing and from the outer universal connection.

Another object of the invention is to provide simple means for regulating the position of the driving member at the hub with relation to the dust ring that seals the universal connection at the wheel hub.

Further objects of the invention will appear hereinafter.

The invention consists of novel parts and combination of parts to be described hereinafter, all of which contribute to produce an effective fore-wheel drive connection.

A preferred embodiment of the invention is described in the following specification, while the broad scope of the invention is pointed out in the appended claims.

In the drawing:

The figure is a horizontal section taken substantially in a horizontal plane through the flexible connection and through the housing, certain parts of the wheel being broken away or omitted.

Referring to the drawing, 1a represents a rigid frame member carrying two springs such as spring 1, each spring being attached at its outer end to a corresponding crosshead 2, affording a bearing 3 below the axis of the wheel for a king pin 4, it being understood that there is a corresponding king pin and bearing above the axis of the wheel, in alignment with the lower king pin which is illustrated. The king pins are formed at the upper and lower sides of a wheel support, bracket or spindle in the form of a cylindrical or tubular housing 5; the body of this spindle is in the form of a ring with an outboard end of cylindrical form with a bore 6 of reduced diameter. Any suitable construction may be used so that if the wheel hits an obstacle a relative movement may take place between the tubular housing 5 and the frame 1a of the automobile.

The outer side of the tubular housing forms a bearing 7 for the wheel hub 8 that is to be driven by a flexible connection or, a jointed shaft extending through the bore of the housing.

In the present instance, the hub 8 is provided on its interior with a double conical bearing ring 9 that runs on conical rollers 10 running on roller race rings 11. It should be understood, however, that if desired, roller bearings of other types or ball bearings can be provided at this point, or if desired, a plain bearing or bearings could be used without either rollers or balls.

The hub 8 is provided on its outer side with a driving cap 12 that is secured to it by a plurality of bolts 13 and this driving cap has a substantially cylindrical outboard extension 14 formed with an annular seat 15. On this seat is secured the driven member 16 of a universal connection, said driven member being in the form of a bracket or skeleton plate 17 that is secured by bolts 18 on the seat and provided with two forks 19, each of which carries a cross pin 20. On these pins 20 the driving member 21 of the universal connection or joint is carried and this member 21, which constitutes a driving spider, is provided with pins 22 similar to the pins 20 but which, in the illustration, are disposed with their axes in a substantially horizontal plane. The pins 22 are carried respectively in oppositely disposed forks 23, said forks being formed as a driving head on the outer end of an outer shaft section or hub-shaft 24 which extends outwardly from a universal driving connection 25 driven by a driving shaft 24a that is driven by the engine. It should be understood that this universal connection 25 permits in and out sliding movement of the shaft 24, but enables the shaft 24a to rotate the shaft 24 in any position the wheel bracket 5 may assume in steering the wheel or caused by road shock. For this purpose I provide a telescoping splined driving connection 25a associated with the inner universal connection 25.

It will be noted that in the construction illustrated, the housing 5 is of greatly reduced diameter and is of such small diameter that it is very much smaller than the outside diameter or dimensions of the driving head formed by the forks 23. The middle plane of the bearing, which may also be the middle plane of the wheel 25, is therefore displaced in an inboard direction, a considerable distance from the plane in which the universal driving spider 21 rotates. In order to exclude dust from the bearing and prevent its passing into the bearing by moving in an outboard direction through the bore 6 of the tubular housing 5, I provide a dust bonnet 26 of concavo-convex form. This is in the form of a shield which is preferably formed of sheet metal and is also preferably of spherical curvature with the center of curvature located substantially at the center of the driving spider 21 of the universal joint. This dust bonnet 26 closes the outboard end of the bore 6 and also encases the shaft section 24, being provided with an offset hub portion 27 that hugs a shoulder 28 formed on the shaft section at this point.

In order to make the connection a substantially dust-proof one, I provide a dust ring 29 in the form of a compressible packing that is countersunk into a substantially spherical cheek 30 which is formed in the outboard end of the bore 6, so as to lie substantially against the spherical outer face of the dust bonnet 26. This ring is preferably of fiber, rubber, leather or other non-metallic material.

The dust bonnet is of sufficient size so as to act as an apron large enough to insure that its outboard edge will always be located in an outboard position with respect to the dust ring 29 in any position the tubular housing may assume.

In order to exclude dust from the inboard end of the bearing 7, I provide a dust ring 31 received in a circumferential groove 32 formed in the inboard end of the hub member 8, said dust ring lying against a cylindrical neck 33 of slightly larger diameter than the diameter of the bearing 7. This ring may be of the same material as the packing ring 29.

The universal joint member 17 preferably does not seat directly on the seat 15, but I prefer to provide a seat plate 34 at this point. By varying the thickness of this plate, a convenient means is provided for adjustment so that the shield 26 will bear against the dust ring 29. Incidentally, the plate 34 closes the relatively large opening 36 that is formed in the center of the annular seat 15.

The inner cap 12 may be enveloped in an outer cap 37 having a disc or hub portion 38 that is secured in place by the bolts 13, already referred to, and this hub portion is constructed with means, not illustrated, for securing it to the rim 39.

The outer end of the outer cap 37 may be expanded to form a "hub nut" 40 covered by a detachable hub plate 41 to carry the name of the maker of the car or automobile.

Referring again to the universal joint or driving connection 25, I form the splined telescoping connection 25a by providing the driven member 42 of this universal joint with a tubular sleeve 43 that telescopes over splines 44 formed around the periphery of the shaft 24. This shaft is preferably of enlarged diameter at this point. These splines or flutes slide in corresponding spline grooves 45 formed longitudinally in the bore of the tubular extension 43. The driving member 46 of the universal joint 25 is attached on rocking pins 47 to a disc 48 that is secured to a head 49 having a tapered hub that fits over the tapered end of the driving shaft 24a.

The rocking pins 47 give a positive axis of rotation in this universal joint, and this positive axis of rotation is maintained in a fixed plane with respect to the drive shaft 24a, and of course, extends at right angles to the drive shaft.

In order to make this universal joint and the spline connection 25a dust-proof, I provide the outer end of the sleeve 43 with a screw cap 50 in the form of a dust cap having a packing ring 51 of soft material, such as employed for the packing rings 29 and 31. In addition to this, the disc 48 carries a hood 52 in the form of a light sheet metal shell, the outer portion 53 of which is substantially of spherical form having its center of curvature at the geometric center of the joint 25. This hood cooperates with a bonnet 54 also formed of light sheet metal and having a cylindrical neck 55 that fits over the outside of the sleeve 43.

A coil spring 56 is provided on the outside of the sleeve that presses the bonnet 54 toward the hood 53. This bonnet 54 is of substantially spherical form and is provided at its edge with a circumferential offset groove 57 to receive a soft dust ring 58. The bonnet 26 ooopering with the packing ring 29 seals off an oil space surrounding the universal joint 16 in the hub member 14 and this space within the hub member communicates with the interior of the roller bearing at 10 which is sealed off by the packing ring 31. In this way, both of these spaces communicate and may be oiled simultaneously by one oiling operation.

While the universal joints described above are very suitable for a flexible drive, there are, of course, other types of universal joints and telescoping connections that would be just as suitable and I do not wish to confine my invention to the particular types illustrated.

It is understood that the embodiment of the invention described herein is only one of the many embodiments this invention may take, and I do not wish to be limited in the practice of the invention, nor in the claims, to the particular embodiment set forth.

What I claim is:

1. In a flexible drive connection for an automobile, the combination of a transverse driving shaft, a hub shaft, a universal connection connecting the hub shaft with the driving shaft, said universal connection including a driven member with a tubular extension having a telescoping splined connection with the inner end of the hub shaft, a tubular housing mounted to swing on a pivot in steering, a wheel rotatably mounted on the tubular housing, a universal connection connecting the outer end of the hub shaft with the wheel, said last named universal connection being located beyond the outer end of the tubular housing, and thereby enabling the tubular housing to be made of reduced diameter, a dust bonnet encasing the last named universal connection adjacent the wheel hub, and a dust ring carried by the tubular housing and engaging the outer face of the said bonnet to exclude road dirt from the outer universal connection.

2. In a fore-wheel drive connection, the combination of a shaft with a joint and an outer shaft section, a driven member, a universal connection between the outer section and the driven member for driving the same, a tubular shaft housing, means for supporting the housing to swing on an axis, said axis located at the inboard end of the housing, said housing enveloping the said outer shaft section and located at the inboard side of the said universal connection, a hub member connected with the driven member and having its bearings on the outer side of the said housing, the middle plane of said bearings being displaced in an inboard direction from the universal connection, and a concavo-convex dust bonnet carried by, and enveloping, the said outer shaft section and closing the outboard end of the bore of said housing.

3. In a fore-wheel drive connection the combination of a shaft having an outer shaft section, a driven member, a universal connection between the outer shaft section and the driven member for driving the same, a tubular shaft housing having a ring at its inboard end, means for supporting the ring to swing on a vertical axis for steering, said housing having a cylindrical part projecting in an outboard direction from the ring enveloping the said outer shaft section and located at the inboard side of the said universal connection, a hub member connected with the driven member and having its bearings on the outer side of the said cylindrical part of said housing, the middle plane of said bearings being displaced in an inboard direction from the universal connection, a concavo-convex dust bonnet carried by, and enveloping, the said outer shaft section and closing the outboard end of the bore of said housing, and a dust ring mounted between the dust bonnet and the bore of the housing.

4. In a flexible drive connection, the combination of a flexible shaft having an outer shaft section with a pair of forks, a driven member in the form of a plate with a pair of forks projecting inwardly from its inboard side, cross pins connecting the forks, and forming a universal connection between the outer shaft section and the driven member for driving the same, a tubular shaft housing enveloping the said outer shaft section and located at the inboard side of the said universal connection, a hub member rigidly connected with the plate of the driven member and having its bearings on the outer side of the said housing, and an aligning spacer between the hub member and the driven member.

5. In a mechanism of the kind described, the combination of a wheel spindle or support of cylindrical form, a wheel with a hub member having a roller bearing on the outer side of the same, a packing ring on the inboard side of said bearing, a universal joint connected to the wheel and located in an outboard relation with respect to the spindle, a bonnet imposed between the spindle and the universal joint enclosing, and carried by, the inboard side of the universal joint, with a packing ring cooperating with the bonnet, said hub member enveloping the outer side of the universal joint so that an oil chamber is formed within the hub member surrounding the universal joint and communicating with the interior of the roller bearing.

6. In a fore-wheel drive connection, the combination of a frame, a transverse drive-shaft rotatably mounted in the frame, a universal connection including a driving member, a pin pivotally attaching the driving member to the said drive-shaft on an axis extending at right angles to the drive-shaft, said pin being maintained in a fixed plane with respect to the drive-shaft, and a driven member pivotally attached to the driving member, a telescoping splined slip-joint formed on the driven member, and independent of the universal connection, said slip-joint having an extension-shaft coaxial at all times with the driven member of the universal connection, a wheel-hub, a second universal connection having a driven member rigidly connected to the wheel-hub, and a pivot connection connecting the outer end of the extension-shaft to the last named driven member; and a pivot center for steering located between the two universal connections.

7. In a fore-wheel drive connection, the combination of a transverse drive-shaft, a universal connection driven by said transverse drive-shaft having a positive axis of rotation fixed on the drive-shaft and extending at right angles to the drive-shaft, said last-named axis of rotation being maintained in a fixed plane with respect to the drive-shaft, said universal connection including a splined slip-joint, a splined shaft extension from the slip-joint, a wheel member, a second universal connection connecting said shaft extension and the wheel member, and a pivot center for steering located between the two universal connections.

8. In a fore-wheel drive connection, the combination of a transverse drive-shaft, a universal connection driven by said transverse drive-shaft having a positive axis of rotation fixed on the drive-shaft and extending at right angles to the drive-shaft, said last-named axis of rotation being maintained in a fixed plane with respect to the drive-shaft, said universal connection including a splined slip-joint with internal splines located at said universal joint, an extension-shaft extending from the slip-joint with external splines, a wheel member, a second universal connection connecting said extension-shaft and the wheel member, and a pivot center for steering located between the two universal connections.

CLIFTON R. ROCHE.